United States Patent Office 2,931,069
Patented Apr. 5, 1960

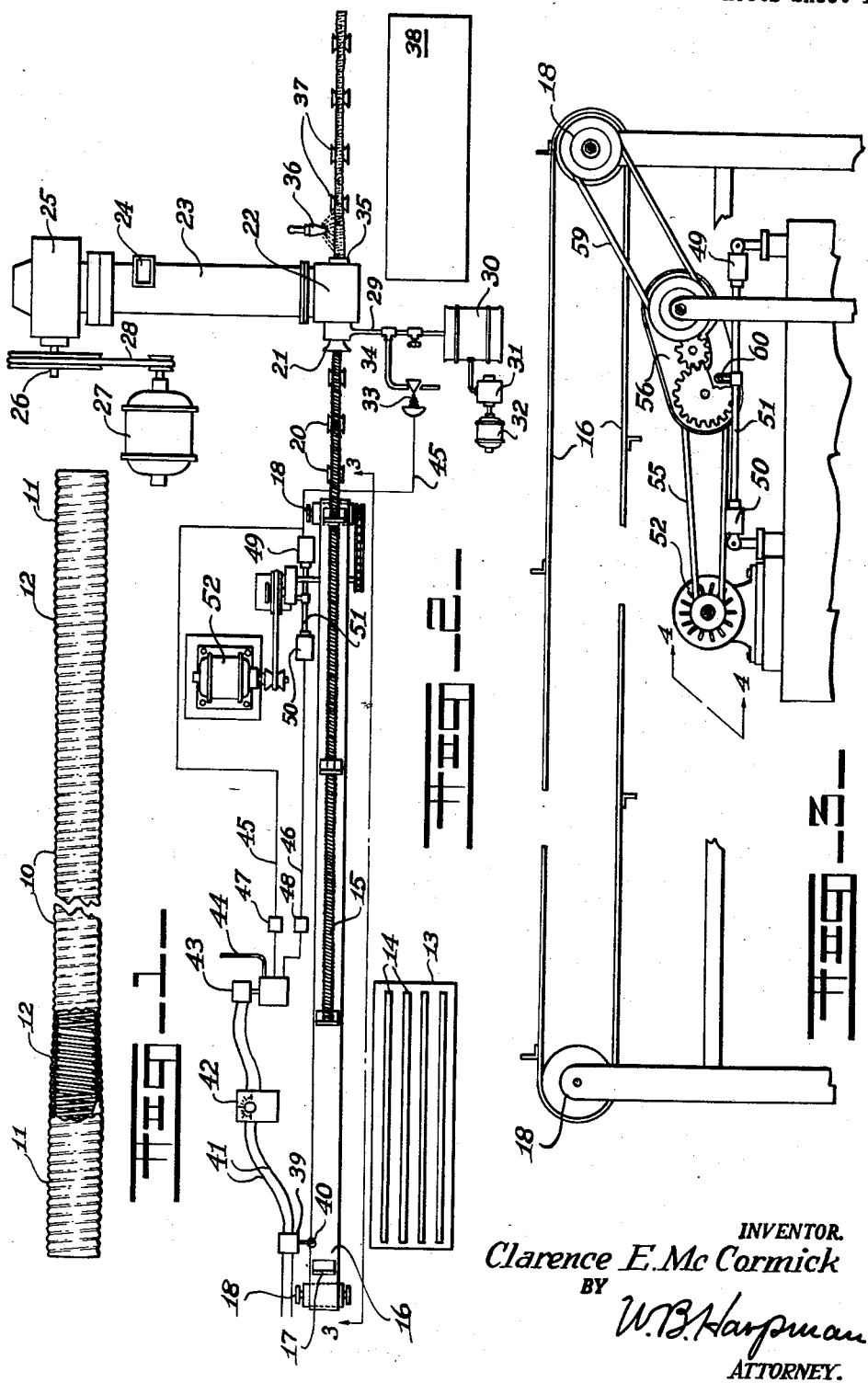

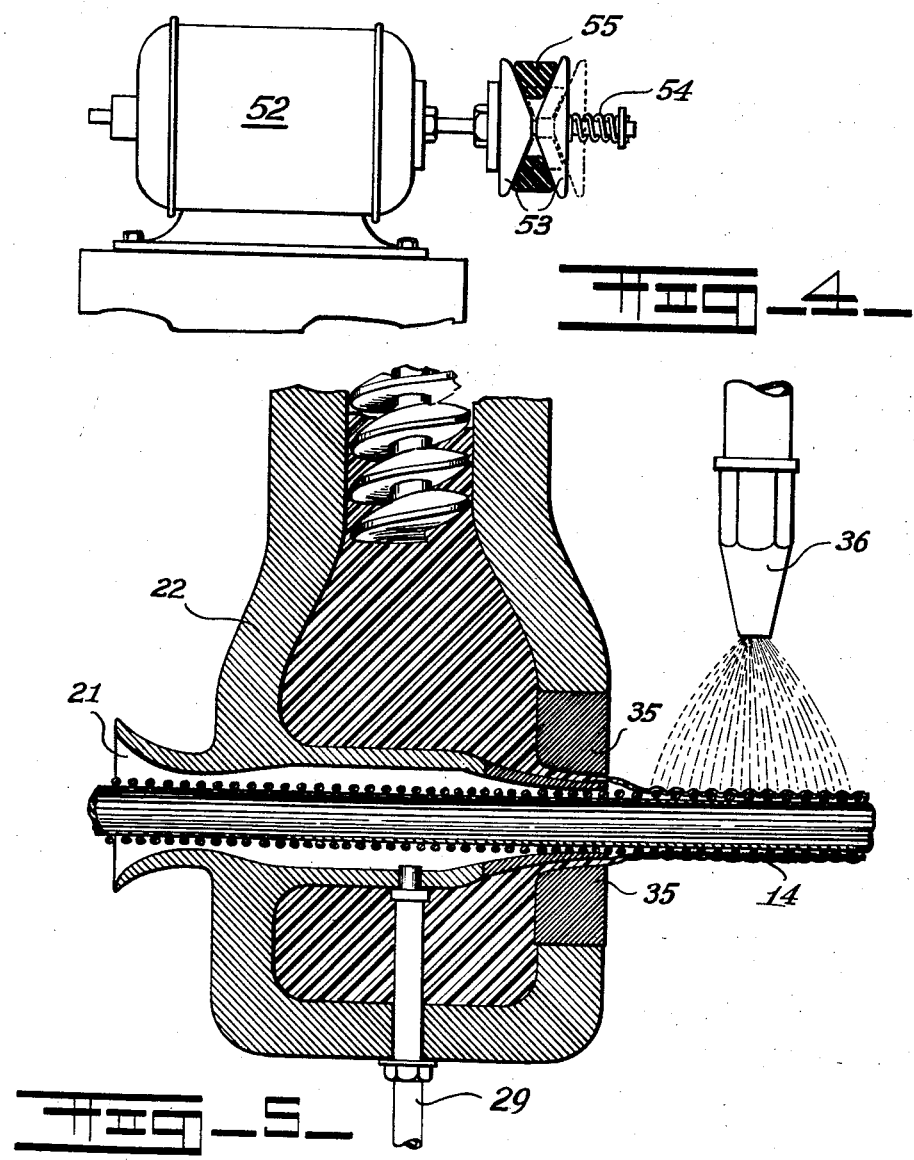

2,931,069

METHOD OF FORMING FLEXIBLE VACUUM HOSE

Clarence E. McCormick, Poland, Ohio, assignor to Lee Rubber & Tire Corporation, doing business as Republic Rubber Division, Youngstown, Ohio, a corporation of New York Application March 18, 1957, Serial No. 646,796

3 Claims. (Cl. 18—59)

This invention relates to a method of forming flexible plastic hose wherein the end sections of the hose are thickened with respect to the remainder thereof.

The principal object of the invention is the provision of a method of forming a flexible vacuum hose incorporating a spiral reinforcing wire and a jacket or cover of thermoplastic material, and wherein the jacket or cover of thermoplastic material is thickened adjacent the ends of the sections of hose formed.

A further object of the invention is the provision of a method of forming flexible, spiral reinforced conduit having an impervious thermoplastic jacket or cover, the thickness of which may be varied longitudinally of the hose, as desired.

Those skilled in the art will recognize that flexible vacuum hoses incorporating radial reinforcing means usually in the form of a spiral wire and a thermoplastic resin jacket have heretofore been produced. Such hoses as heretofore known have had the disadvantage of uniform wall thickness of the cover or jacket which was preformed as a tubular member and positioned over the spiral reinforcing member and then forced into desirable position while the material set. Such hose, while widely used, has the marked disadvantage of early failure in the areas adjacent the ends thereof in which metal couplings are usually provided.

The vacuum hose formed by the method disclosed herein possesses completely different characteristics as well as an increased life expectancy due to the direct formation of the thermoplastic jacket or cover on the spiral reinforcing member and the ability of the forming equipment to deposit as much or as little of the thermoplastic material as desired as determined by the degree of relative movement of the spiral reinforcing member into and through the area of formation of said jacket. For example, a mandrel having a spiral wire disposed thereabout may be passed through the thermoplastic jacket forming device at a uniform rate of travel with respect thereto and whereby the thermoplastic jacket or cover formed thereon will be of uniform thickness. Slowing down the rate of travel of the mandrel or reinforcing wire as at the respective ends of the mandrel and wire will result in increasing the thickness of the thermoplastic jacket or cover in these areas which produces a highly desirable product.

With the foregoing and other objects in view which will appear as the description proceeds, the invention resides in the method of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

Figure 1 is a plan view of a flexible hose, with parts broken away and parts in cross section, formed by the method herein disclosed.

Figure 2 is a top plan view of apparatus for forming a vacuum hose.

Figure 3 is a side elevation of a portion of the apparatus shown in Figure 2.

Figure 4 is a side view of the variable drive apparatus.

Figure 5 is a side elevational view in section of the extruder apparatus.

By referring to the drawing and Figure 1 in particular, it will be seen that a flexible reinforced vacuum hose incorporating a radial reinforcing member and a thermoplastic jacket or cover is illustrated in which the principal portion of the hose has the thermoplastic cover of uniform thickness, as indicated by the numeral 10, while the end sections have thickened sections 11—11 which are tapered with respect to the principal section 10 by intermediate tapered areas 12—12.

The flexible reinforced vacuum hose shown in Figure 1 is particularly useful in connection with vacuum cleaners and the like where it provides a lightweight, strong, flexible, resilient structure with the thickened end sections contributing to a longer life than has heretofore been associated with vacuum hose known in the art.

The vacuum hose of Figure 1 of the drawing is produced by the method and apparatus disclosed herein and by the apparatus shown in Figures 2, 3 and 4 of the drawings.

By referring to Figure 2 of the drawing it will be seen that a table 13 is shown in top plan view with a plurality of mandrels 14 positioned thereon, each of which is adapted to be provided with an encircling, reinforcing wire 15 and then positioned automatically or manually on a moving belt 16 immediately in advance of a cleat 17 thereon which will move the spirally wrapped mandrel 14 from left to right, as shown in Figure 2 of the drawing.

The belt 16 is journaled on suitable idlers and drive means 18—18 which are formed in accordance with known principles so that the belt will travel at the speed of the driven members, as will hereinafter be explained.

The mandrels 14 may obviously include means (not shown) for holding the ends of the spirally wound reinforcing wire 15 thereon. The mandrels 14 move along the belt 16 and off the right end thereof and over a plurality of spaced rollers 20—20 which have arcuate surfaces so as to guide the wrapped mandrels 14 on a uniform longitudinal path into an orifice 21 of a crosshead thermoplastic resin extruding device 22.

The thermoplastic resin extruding device 22 includes the crosshead in which the thermoplastic material is extruded in an annular shape about the wrapped mandrel 14 together with a cylinder 23 in which a screw (not shown) serves to advance the resin into the extruding area. A feeding orifice 24 is provided and suitable gear mechanism 25 is connected with the screw so that the screw may be revolved thereby. The gear mechanism 25 is driven by a shaft and pulley 26 which in turn is connected to a driving motor 27 by a belt 28.

The portion of the crosshead of the thermoplastic resin extruding device 22 adjacent the inlet opening 21 thereof is in communication with a vacuum line 29 which in turn communicates with a vacuum accumulator 30 in which partial vacuum or minus atmospheric pressure is maintained by a vacuum pump 31 driven by a motor 32.

An air operated valve 33 controls a vent line 34 communicating with the vacuum line 29 so that the partial vacuum or minus atmospheric pressure within the line 29 and the crosshead thermoplastic resin extruding device 22 may be varied as by opening the air operated valve 33.

The crosshead thermoplastic resin extruding device 22 continuously delivers thermoplastic material in an annular form about the wrapped mandrels 14 as they pass therethrough and they emerge from an outlet opening 35 opposite to the inlet opening 21 and pass beneath a coolant nozzle 36. The wrapped mandrels 14 are received by a plurality of secondary rollers 37 and may be removed therefrom onto a secondary table 38 after the thermoplastic cover or jacket 10 deposited on the mandrels 14 has been severed as by conventional means, not shown.

In order that the apparatus herein disclosed can form the cover or jacket 10 of thermoplastic material on the wrapped mandrels 14 and provide a uniform thickness of that jacket or cover intermediate the ends of the sections and taper and thicken the end sections, means is provided for varying the rate of travel of the wrapped mandrels 14 with respect to the crosshead thermoplastic resin extruding device 22 and comprises apparatus for altering the speed of the belt 16, as illustrated in Figures 2 and 3 of the drawing.

In Figure 2 of the drawing it will be seen that a pressure sensitive switch 39 is positioned with an actuating arm 40 in the path of the cleat 17 on the belt 16 so that each time one of the cleats 17 passes the switch 39, the actuating arm 40 and the switch is momentarily closed. The impulse occasioned is conveyed by circuit wires 41 to a timing device 42 which in turn controls a solenoid air valve 43 controlling an air line 44. Extensions 45 and 46 of the air line 44 pass through flow control valves 47 and 48, respectively, and communicate with pneumatic cylinders 49 and 50, respectively, which are oppositely disposed with respect to one another and whose pistons are connected by a common piston rod 51. An extension of the air line 45 communicates with and actuates the air operated valve 33 heretofore referred to.

By referring now to Figures 2, 3 and 4 of the drawings it will be seen that the belt 16, trained over the idlers and driven members 18, is actually driven by a motor 52 which is provided with a variable width sheave 53 so arranged that the two parts thereof are normally urged toward one another by a spring 54, as best seen in Figure 4 of the drawing, so that a driving belt 55 trained thereabout will normally be held at the point of largest diameter thereon and hence will travel relatively faster than when the two-part sheave 53 moves apart and the belt 55 travels about a smaller diameter thereof.

In order that different degrees of tension may be automatically imparted to the driving belt 55, a "Dodge" reducer 56 is pivotally mounted on a shaft and the driving belt 55 is trained over a geared idler 57 therein which is driven by a secondary geared idler 58 which in turn is connected by a driving belt or chain 59 with the driving means 18 over which the belt 16 is trained.

The "Dodge" reducer 56 is pivotally attached to the common piston rod 51 by a pivot 60 so that energization of the pneumatic cylinders 49 and 50 will alternately move the piston rod 51 from right to left, as shown in Figure 3 of the drawing, and hence move the "Dodge" reducer 56 in like degree inasmuch as the geared idler 57 is in the portion of the "Dodge" reducer 56 closest to the pivotal connection 60.

When this occurs, the tension of the driving belt 55 will vary with a change in the diameter of the sheave 53 which results in a change in the speed in the driving belt 55 and hence the speed of the belt 16.

In operation, the cleat 17 strikes the arm 40, energizes the switch 39 and starts the timer 42 on a predetermined timing cycle whereupon the solenoid valve 43 is energized for that cycle which, it will be observed, corresponds with the end of one mandrel 14 and the beginning of the next, that is, the area on either side of the cleat 17, and the resulting action of the pneumatic cylinders 49 and 50, as just disclosed, causes the slow-down of the belt 16 during that cycle with the result that the wrapped mandrel 14 entering the crosshead thermoplastic resin extruding device 22 slows down. As the rate of extrusion of the thermoplastic resin is uniform, a coating of increased thickness is imparted to the mandrel 14 as it enters and leaves the device 22.

The timer 42 which controls the operation then gradually releases the solenoid valve 43 which in turn permits normal air pressure in the lines 45 and 46 to be re-established and the pneumatic cylinders 49 and 50 return the common piston rod 51 to its initial position whereupon the "Dodge" reducer 56 moves to its initial position, tension on the belt 55 is relaxed, the two-part driving sheave 53 closes, and the driving belt speeds up to normal speed.

The mandrels 14 push one another through the crosshead thermoplastic resin extruding device 22 and thus the intermediate or principal portion of the elongated mandrel 14 is provided with a relatively uniform thin cover and with uniform thickness.

As the mandrel 14 approaches the orifice 21, the next cleat 17 on the belt 16 again energizes the switch 39, the timer 42 again actuates the solenoid valve 43 and the pressure in the cylinders 49 and 50 again varies with the subsequent motion of the "Dodge" reducer 56 and the increased tension on the driving belt 55 whereupon the two-part sheave 53 moves apart, the belt follows the lesser diameter and slows down so that the progressive rate of travel of the mandrel through the crosshead thermoplastic resin extruding device 22 slows down uniformly causing an increased tapering thickness of the thermoplastic resin being deposited on the mandrel to form the section 12, as heretofore disclosed, and a subsequent uniformly thick end section 11 which extends over onto the leading end of the following wrapped mandrel 14, thus completing the cycle.

It will occur to those skilled in the art that while one practical and efficient mechanical device for achieving this variance of rate of travel of the mandrel through the crosshead thermoplastic resin extruding device 22 has been described, other means may be employed without departing from the spirit of the invention and particularly the method of forming a reinforced flexible vacuum hose wherein the principal section has a relatively thin cover or jacket of uniform thickness and the ends thereof taper from said thin uniform thickness to a relatively heavier section to produce the desired object.

It will also occur to those skilled in the art that when the speed of the mandrel 14 passing through the crosshead thermoplastic resin extruding device 22 varies, the vacuum action exerted on the mandrel and the interior of the jacket or cover thus formed on the mandrel will necessarily vary, and it will be seen that the control of the air operated valve 33 by the same actuating system controls the speed of the belt 16 and will cause a variance in the vacuum or minus atmospheric pressure by opening and closing the vent line 34 which communicates with the line 29. Thus, a lesser degree of vacuum is present during the depositing of the uniformly thin jacket or cover intermediate the ends of the mandrel 14 which suitably serves to draw the semi-plastic thermoplastic resin into the desired conformation about the radial reinforcing wire 15 and holds it while it sets, while increased vacuum is necessary to perform the same function on the thickened sections and this is achieved by the closing of the air operated valve 33 at those times.

In this connection those skilled in the art will observe that the surface configuration of the plastic vacuum hose produced by the method herein disclosed in such that the hose has a corrugated effect with the cover or jacket 10 as well as the thickened end sections 11 and 12 following approximately half of the radius of the convolutions of the spiral reinforcing wire 15.

It will thus be seen that the several objects of the invention have been met by the method and apparatus for forming flexible vacuum hose disclosed herein.

Having thus described my invention, what I claim is:

1. The method of forming a flexible radially reinforced vacuum hose having a unitary thermoplastic cover which comprises positioning a radial reinforcing member on a mandrel and moving said mandrel and reinforcing member through an area wherein a thermoplastic material is formed thereon while producing a partial vacuum about the mandrel and reinforcing member to hold the thermoplastic material formed thereon thereagainst, decreasing the rate of travel of the mandrel and reinforcing member as the thermoplastic material is formed on the end portions of the reinforcing member while simultaneously increasing the degree of vacuum about the mandrel and reinforcing member, and increasing the rate of travel of the mandrel and reinforcing member as the thermoplastic material is formed on an intermediate portion of the reinforcing member while simultaneously decreasing the degree of vacuum to thereby form an article having a relatively thin covering in the central portion thereof with a covering of greater thickness at opposite ends thereof.

2. The method of forming a flexible radially reinforced vacuum hose having a unitary thermoplastic cover which comprises positioning a radial reinforcing member on a mandrel, moving said mandrel and reinforcing member through a treating area, extruding a tube of thermoplastic material of larger diameter than said reinforcing member around the reinforcing member as it passes through the treating area, producing a partial vacuum within said extruded tube and about said reinforcing member to hold the thermoplastic material against the reinforcing member, sensing the position of said reinforcing member with respect to said treating area, and controlling the rate of travel of the reinforcing member and the degree of vacuum applied such that the rate of travel of the reinforcing member is decreased as the thermoplastic material is formed on the end portions of the reinforcing member while simultaneously increasing the degree of vacuum about the mandrel and reinforcing member, and such that the rate of travel of the reinforcing member is increased as the thermoplastic material is formed on an intermediate portion of the reinforcing member while the degree of vacuum is simultaneously decreased to thereby form an article having a relatively thin covering in the central portion thereof with a covering of greater thickness at opposite portions thereof.

3. The method of forming a flexible reinforced vacuum hose comprising the steps of positioning a predetermined length of a spiral reinforcing member on a mandrel of predetermined length, moving a plurality of mandrels with reinforcing members mounted thereon in substantially axial alignment with one another through a treating area, extruding a tube of thermoplastic material of larger diameter than said reinforcing member around the reinforcing member as it passes through the treating area, and producing a partial vacuum within said extruded portion and about said reinforcing member to hold the thermoplastic material against the reinforcing member, controlling the rate of travel of each predetermined length of reinforcing member through the treating area and controlling the vacuum applied such that the leading end of the reinforcing material as it passes through the treating area travels at a first predetermined speed and at a predetermined degree of vacuum while depositing the thermoplastic material about the leading end portion, then progressively increasing the speed and progressively reducing the degree of vacuum applied to form an inwardly tapered portion of thermoplastic covering, then moving the mandrel at a relatively greater constant speed while simultaneously applying a relatively less degree of vacuum to form a relatively thin central covering portion, then progressively slowing down the speed of movement of the predetermined length of reinforcing material through the treating area while progressively increasing the degree of vacuum applied to form an outwardly tapered portion toward the trailing end of the predetermined length of material, and then forming a covering on the trailing end of the predetermined length of reinforcing member at the same speed and simultaneously applying the same degree of vacuum as employed when forming the covering on the leading end portion of the predetermined length of reinforcing member to provide a finished length of vacuum hose including opposite end portions having a covering of increased thickness and a central portion having a covering of decreased thickness, the end portions and the central portions being interconnected by tapered portions.

References Cited in the file of this patent

UNITED STATES PATENTS

| | | |
|---|---|---|
| 1,316,052 | Lister | Sept. 16, 1919 |
| 2,176,762 | Forbes | Oct. 17, 1939 |
| 2,266,226 | Mall | Dec. 16, 1941 |
| 2,372,162 | Ryan | Mar. 20, 1945 |
| 2,471,752 | Ingmanson | May 31, 1949 |
| 2,513,106 | Prendergast | June 27, 1950 |
| 2,620,514 | Sampson et al. | Dec. 9, 1952 |
| 2,705,041 | Meyers et al. | Mar. 29, 1955 |
| 2,708,771 | Stoneback | May 24, 1955 |

FOREIGN PATENTS

| | | |
|---|---|---|
| 639,538 | Great Britain | June 28, 1950 |
| 810,638 | France | Dec. 28, 1936 |